US012772011B2

(12) United States Patent
Polinske et al.

(10) Patent No.: US 12,772,011 B2
(45) Date of Patent: Oct. 20, 2026

(54) RADIO FREQUENCY ANTENNA FOR AN IN-THE-EAR HEARING DEVICE

(71) Applicant: Starkey Laboratories, Inc., Eden Prairie, MN (US)

(72) Inventors: Beau Jay Polinske, Minneapolis, MN (US); Jay Rabel, Shorewood, MN (US); Randy Kannas, Minneapolis, MN (US); Deepak Pai Hosadurga, Bloomington, MN (US); Zhenchao Yang, Eden Prairie, MN (US); Jay Stewart, Eden Prairie, MN (US); Michael J. Tadeusiak, Minneapolis, MN (US); Stephen Paul Flood, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 204 days.

(21) Appl. No.: 18/673,649

(22) Filed: May 24, 2024

(65) Prior Publication Data

US 2024/0430628 A1 Dec. 26, 2024

Related U.S. Application Data

(63) Continuation of application No. 17/933,995, filed on Sep. 21, 2022, now Pat. No. 12,022,263, which is a (Continued)

(51) Int. Cl.
*H04R 25/00* (2006.01)

(52) U.S. Cl.
CPC ......... *H04R 25/554* (2013.01); *H04R 25/602* (2013.01); *H04R 25/558* (2013.01); (Continued)

(58) Field of Classification Search
CPC ... A61B 3/16; H01Q 1/38; H01Q 7/00; H01Q 9/0421; H01Q 9/06; H01Q 9/24; (Continued)

(56) References Cited

U.S. PATENT DOCUMENTS 6,249,587 B1 * 6/2001 Clavadetscher ..... H04R 25/658 381/322
7,742,614 B2 * 6/2010 Christensen ......... H04R 25/554 320/108

(Continued)

OTHER PUBLICATIONS

U.S. Appl. No. 15/272,012 U.S. Pat. No. 10,051,388, filed Sep. 21, 2016, Radio Frequency Antenna for an in-the-ear Hearing Device.

(Continued)

*Primary Examiner* — Gerald Gauthier
(74) *Attorney, Agent, or Firm* — Schwegman Lundberg & Woessner, P.A.

(57) ABSTRACT

Disclosed herein, among other things, are systems and methods for a hearing device antenna. One aspect of the present subject matter includes a hearing device configured to be worn in an ear of a wearer to perform wireless communication. The hearing device includes a housing, hearing electronics within the housing, and an inverted F antenna or loop antenna disposed at least partially in the housing and configured for performing 2.4 GHz wireless communication. In various embodiments, at least a portion of the antenna protrudes from an exterior of the housing.

20 Claims, 8 Drawing Sheets

Related U.S. Application Data continuation of application No. 16/900,529, filed on Jun. 12, 2020, now Pat. No. 11,470,430, which is a continuation of application No. 16/058,346, filed on Aug. 8, 2018, now Pat. No. 10,687,156, which is a continuation of application No. 15/272,012, filed on Sep. 21, 2016, now Pat. No. 10,051,388.

(52) U.S. Cl.
CPC .... *H04R 2225/025* (2013.01); *H04R 2225/31* (2013.01); *H04R 2225/33* (2013.01); *H04R 2225/51* (2013.01); *H04R 2460/17* (2013.01)

(58) Field of Classification Search
CPC ...... H01Q 21/78; H04R 25/55; H04R 25/554; H04R 25/558; H04R 25/602; H04R 25/603; H04R 25/658; H04R 2225/025; H04R 2225/31; H04R 2225/33; H04R 2225/51; H04R 2460/17; H04R 25/00; H04R 25/505; H04R 25/552; H04R 25/65; H04R 25/70
See application file for complete search history.

(56) References Cited

U.S. PATENT DOCUMENTS

| | | | | |
|---|---|---|---|---|
| 8,184,842 | B2 * | 5/2012 | Howard | H04R 25/603<br>381/328 |
| 8,625,830 | B2 * | 1/2014 | Probst | H04R 25/00<br>381/328 |
| 9,661,426 | B2 * | 5/2017 | Ozden | H04R 25/505 |
| 9,877,119 | B2 * | 1/2018 | Ozden | H04R 25/554 |
| 10,051,388 | B2 * | 8/2018 | Polinske | H04R 25/602 |
| 12,022,263 | B2 * | 6/2024 | Polinske | H04R 25/554 |
| 2005/0168396 | A1 * | 8/2005 | Victorian | H01Q 7/00<br>343/788 |
| 2007/0229369 | A1 * | 10/2007 | Platz | H04R 25/554<br>343/866 |
| 2010/0020994 | A1 * | 1/2010 | Christensen | H04R 25/554<br>381/315 |
| 2010/0026580 | A1 * | 2/2010 | Tang | H01Q 9/0421<br>343/700 MS |
| 2013/0343586 | A1 * | 12/2013 | Kvist | H04R 25/554<br>381/315 |
| 2014/0010393 | A1 * | 1/2014 | Kvist | H01Q 9/24<br>381/315 |
| 2014/0010394 | A1 * | 1/2014 | Kvist | H01Q 9/24<br>381/315 |
| 2014/0023216 | A1 * | 1/2014 | Solum | H04R 25/554<br>381/315 |
| 2014/0270191 | A1 * | 9/2014 | Nikles | H04R 25/552<br>381/328 |
| 2014/0296687 | A1 * | 10/2014 | Irazoqui | A61B 3/16<br>600/398 |
| 2014/0354495 | A1 * | 12/2014 | Yang | H01Q 9/06<br>343/750 |
| 2015/0289067 | A1 * | 10/2015 | Riepenhoff | H01Q 21/28<br>381/315 |
| 2016/0037270 | A1 * | 2/2016 | Polinske | H04R 25/558<br>381/315 |
| 2016/0192091 | A1 * | 6/2016 | Polinske | H04R 25/65<br>381/315 |
| 2016/0330552 | A1 * | 11/2016 | Flood | H01Q 9/28 |
| 2016/0360328 | A1 * | 12/2016 | Schmidt | H04R 25/70 |
| 2016/0381470 | A1 * | 12/2016 | Henriksen | H04R 25/652<br>381/315 |
| 2016/0381471 | A1 * | 12/2016 | Henriksen | H04R 25/554<br>381/315 |
| 2017/0034635 | A1 * | 2/2017 | Ozden | H04R 25/554 |
| 2017/0171676 | A1 * | 6/2017 | Pinto | H04R 25/55 |
| 2020/0128336 | A1 * | 4/2020 | Troelsen | H01Q 1/38 |
| 2024/0430628 | A1 * | 12/2024 | Polinske | H04R 25/554 |

OTHER PUBLICATIONS

U.S. Appl. No. 16/058,346 U.S. Pat. No. 10,687,156, filed Aug. 8, 2018, Radio Frequency Antenna for an in-the-ear Hearing Device.
U.S. Appl. No. 16/900,529 U.S. Pat. No. 11,470,430, filed Jun. 12, 2020, Radio Frequency Antenna for an in-the-ear Hearing Device.
U.S. Appl. No. 17/933,995 U.S. Pat. No. 12,022,263, filed Sep. 21, 2022, Radio Frequency Antenna for an in-the-ear Hearing Device.
"U.S. Appl. No. 17/933,995, Non Final Office Action mailed Nov. 7, 2023", 13 pgs.
"U.S. Appl. No. 17/933,995, Notice of Allowance mailed Feb. 22, 2024", 13 pgs.
"U.S. Appl. No. 17/933,995, Preliminary Amendment filed Feb. 6, 2023", 5 pgs.
"U.S. Appl. No. 17/933,995, Response filed Feb. 7, 2024 to Non Final Office Action mailed Nov. 7, 2023", 7 pgs.

* cited by examiner

RADIO FREQUENCY ANTENNA FOR AN IN-THE-EAR HEARING DEVICE

CROSS-REFERENCE TO RELATED APPLICATION

This application is a continuation of U.S. patent application Ser. No. 17/933,995, filed Sep. 21, 2022, which is a continuation of U.S. patent application Ser. No. 16/900,529, filed Jun. 12, 2020, now issued as U.S. Pat. No. 11,470,430, which is a continuation of U.S. patent application Ser. No. 16/058,346, filed Aug. 8, 2018, now issued as U.S. Pat. No. 10,687,156, which is a continuation of U.S. patent application Ser. No. 15/272,012, filed Sep. 21, 2016, now issued as U.S. Pat. No. 10,051,388, which is incorporated by reference herein in its entirety.

TECHNICAL FIELD

This document relates generally to hearing systems and more particularly to a radio frequency (RF) antenna for a hearing device.

BACKGROUND

Modern hearing devices, such as hearing assistance devices, are electronic instruments worn in or around the ear. Hearing aids are one example of hearing assistance devices that compensate for hearing losses of hearing-impaired people by specially amplifying sounds. The sounds may be detected from a wearer's environment using a microphone in a hearing aid and/or received from a streaming device via a wireless link. Wireless communication may also be performed for programming the hearing aid, for receiving information from the hearing aid, or for ear-to-ear communications such as data transfer. Wearers generally prefer that their hearing devices are minimally visible or invisible, do not interfere with their daily activities, and are easy to maintain. The hearing devices may each include an antenna for the wireless communication.

Accordingly, there is a need in the art for improved systems and methods for hearing device antennas.

SUMMARY

Disclosed herein, among other things, are systems and methods for a hearing device antenna. One aspect of the present subject matter includes a hearing device configured to be worn in an ear of a wearer to perform wireless communication. The hearing device includes a housing, hearing electronics within the housing, and an inverted F antenna disposed at least partially in the housing and configured for performing 2.4 GHz wireless communication, the antenna having a single ended structure and including a shunt connected to a battery for tuning impedance of the antenna. In various embodiments, at least a portion of the antenna protrudes from an exterior of the housing.

Another aspect of the present subject matter includes a method for providing a hearing device with a housing and having hearing electronics within the housing, the hearing device with capability for wireless communication. The method includes providing an inverted F antenna disposed at least partially in the housing and configured for performing 2.4 GHz wireless communication, the antenna having a single ended structure and including a shunt connected to a battery for tuning impedance of the antenna. In various embodiments, the housing includes a faceplate and a removal string connected to the housing and protruding through an exterior surface of the faceplate, and at least a portion of the antenna is configured to be affixed to the removal string.

A further aspect of the present subject matter includes a hearing device configured to be worn in an ear of a wearer to perform wireless communication. The hearing device includes a housing, hearing electronics within the housing, and a loop antenna disposed at least partially in the housing and configured for performing 2.4 GHz wireless communication, including a looped portion of the antenna protruding from a surface of the housing.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
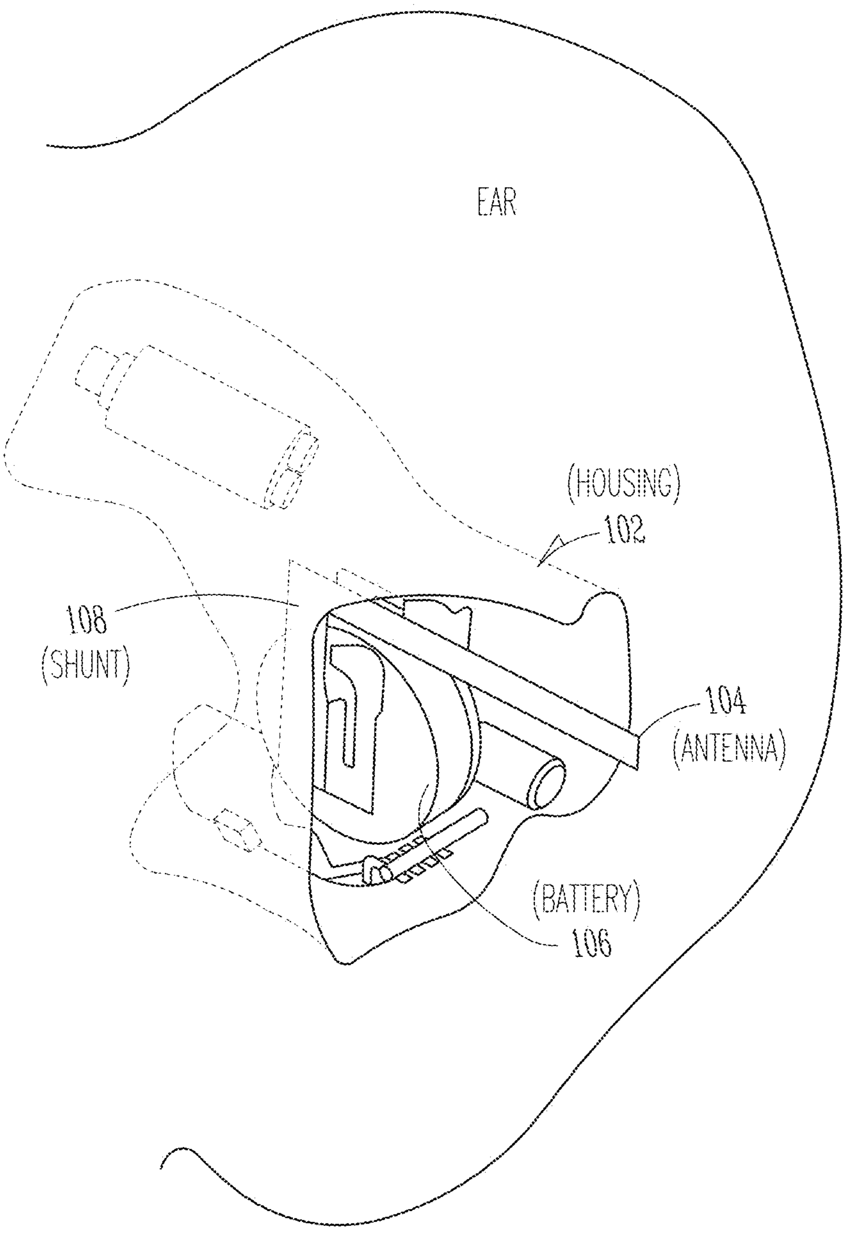
FIG. 1 illustrates a side view of a housing with an inverted F antenna for a hearing assistance device, according to various embodiments of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing devices using the example of hearing assistance devices such as hearing aids. Hearing aids are only one type of hearing device. Other hearing devices include, but are not limited to, those in this document. It is understood that their use in the description is intended to demonstrate the present subject matter, but not in a limited or exclusive or exhaustive sense.

Custom in-the-ear (ITE) hearing devices have limited space to place an antenna. The length of a 2.4 GHz quarter wave in free space is approximately 31 millimeters, which is larger than the length of most hearing devices on their own. In addition, placement of an antenna deep in the ear causes head and/or body loading of the antenna. Thus, most current antennas implemented in this area are limited to approximately −20 dB antenna efficiencies. Therefore, there is a need in the art for improved systems and methods for hearing device antennas for 2.4 GHz communication.

Disclosed herein, among other things, are systems and methods for a hearing device antenna. One aspect of the present subject matter includes a hearing device configured to be worn in an ear of a wearer to perform wireless communication. The hearing device includes a housing, hearing electronics within the housing, and an inverted F antenna disposed at least partially in the housing and configured for performing 2.4 GHz wireless communication, the antenna having a single ended structure and including a shunt connected to a battery for tuning impedance of the antenna. In various embodiments, at least a portion of the antenna protrudes from an exterior of the housing.

An inverted F antenna provides improved antenna efficiency compared to most other antennas currently used in hearing devices. The inverted F antenna of the present subject matter has an efficiency of approximately −12 dB, which is at least 8 dB better than other current solutions. In various embodiments, the antenna of the present subject matter is a single ended structure having a shunt leg tied to the battery for tuning the impedance. The antenna can be part of the lead frame which makes up the battery contacts, in various embodiments. In various embodiments, the radio circuit connects with the antenna and the battery terminal at the faceplate plane inside the shell. The antenna can extend out of the hearing device housing and be affixed alongside the removal string, in various embodiments. In various embodiments, the antenna creates an electric field perpendicular to the head of the wearer which improves the ear-to-ear communication link.

The inverted F antenna of the present subject matter uses vacant space where the hearing assistance circuit is not located, in various embodiments. In addition, the antenna can be extended out of the faceplate and be placed next to a pull string or could be embedded in the faceplate, in various embodiments. The inverted F antenna avoids mechanical interference during assembly and provides an increased antenna efficiency to improve all communication links with the hearing device, in various embodiments.

In various embodiments, the inverted F antenna includes a leg embedded in the faceplate rather than sticking out of it. The antenna leg is embedded in the battery drawer, in an embodiment. In various embodiments, the antenna leg is made of wire instead of stamped metal. The inverted F antenna is integrated in the battery contact of a custom faceplate, in an embodiment. According to various embodiments, the antenna leg sticks out of (or protrudes from) the faceplate perpendicular to the faceplate to optimize car to car communication. Other protrusion angles can be used without departing from the scope of the present subject matter. In one embodiment, an antenna leg is embedded in the faceplate to hide the antenna from the environment. In various embodiments, the antenna leg can be fastened to the removal string. The antenna is embedded in the battery drawer, in various embodiments. In various embodiments, the faceplate or housing includes a sport lock, and a portion of the antenna is included in a portion of the sport lock. In various embodiments, the antenna includes a small diameter wire protruding from the housing or faceplate, such as a nickel-titanium (Nitinol) wire, which in some embodiments can be plated using silver, copper or gold to improve conductivity, antenna performance, and aesthetics. Other types of wire and plating materials can be used without departing from the scope of the present subject matter.

FIG. 1 illustrates a side view of a housing 102 with an inverted F antenna 104 for a hearing device, according to various embodiments of the present subject matter. The hearing device is configured to be worn in an car of a wearer to perform wireless communication. The hearing device includes a housing 102, and an inverted F antenna 104 disposed at least partially in the housing and configured for performing 2.4 GHz wireless communication. According to various embodiments, the antenna 104 has a single ended structure and includes a shunt 108 connected to a battery 106 for tuning impedance of the antenna. In various embodiments, at least a portion of the antenna protrudes from an exterior of the housing, and/or from a faceplate connected to the housing. The portion of the antenna protrudes approximately perpendicularly from the faceplate, in an embodiment.

According to various embodiments, the device includes a faceplate connected to the housing, and the antenna includes a portion embedded in the faceplate. The faceplate includes a battery contact, and the antenna is integrated in the battery contact in various embodiments. According to various embodiments, the housing includes a removal string, and a portion of the antenna that protrudes from the faceplate is configured to attach to the removal string. The hearing device housing includes a battery drawer configured to contain the battery, and the antenna includes a portion embedded in the battery drawer in various embodiments. The antenna includes a wire and/or stamped metal portion, in various embodiments.

Another aspect of the present subject matter includes a method for providing a hearing device with a housing, the hearing assistance device with capability for wireless communication. The method includes providing hearing electronics within the housing and providing an inverted F antenna disposed at least partially in the housing and configured for performing 2.4 GHz wireless communication, and the antenna has a single ended structure and includes a shunt connected to a battery for tuning impedance of the antenna According to various embodiments, the method includes providing a faceplate of the housing and a radio circuit in the housing, and at least a portion of the antenna is configured to connect to the radio circuit at the faceplate. In various embodiments, providing a hearing device includes providing a custom in-the-car (ITE) hearing aid. The method further includes providing a sport lock on the housing, and the antenna includes a portion integrated with the sport lock, in various embodiments.

Figure 2:
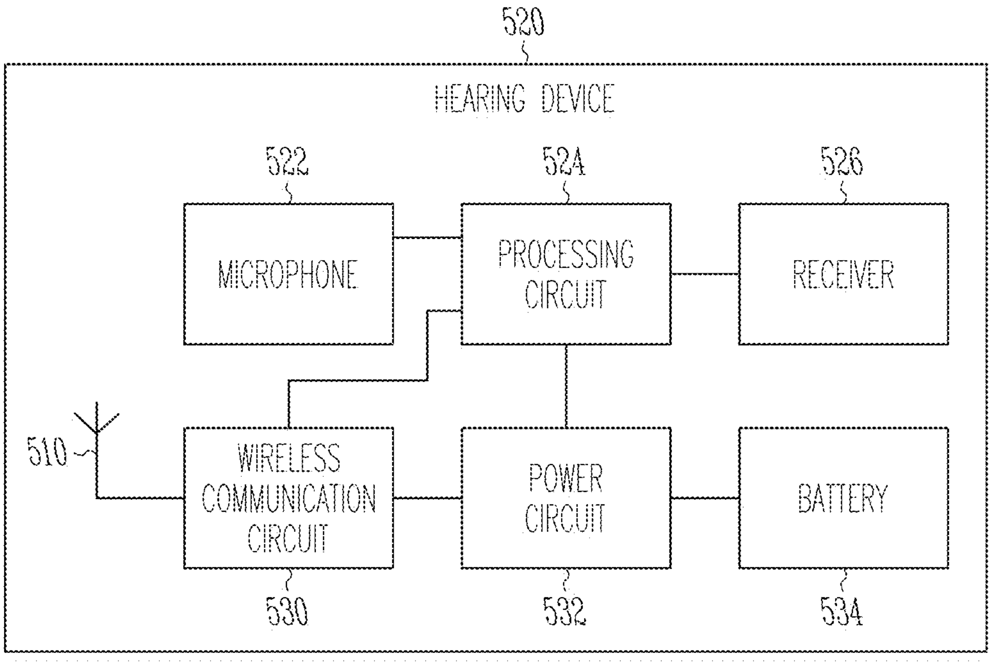
FIG. 2 is a block diagram illustrating an exemplary embodiment of a hearing device.

FIG. 2 is a block diagram illustrating an exemplary embodiment of a hearing device 520. Hearing device 520 includes a microphone 522, a wireless communication circuit 530, an antenna 510, a processing circuit 524, a receiver (speaker) 526, a battery 534, and a power circuit 532. Microphone 522 receives sounds from the environment of the hearing device wearer. Communication circuit 530 communicates with another device wirelessly using antenna 510, including receiving programming codes, streamed audio signals, and/or other audio signals and transmitting programming codes, audio signals, and/or other signals. Examples of the other device includes the other hearing aid of a pair of hearing aids for the same wearer, a hearing aid host device, an audio streaming device, a telephone, and other devices capable of communicating with hearing aids wirelessly. Processing circuit 524 controls the operation of hearing device 520 using the programming codes and processes the sounds received by microphone 522 and/or the audio signals received by wireless communication circuit 530 to produce output sounds. Receiver 526 transmits output sounds to an ear canal of the hearing aid wearer. Battery 534 and power circuit 532 constitute the power source for the operation of hearing aid circuit 520. In various embodiments, power circuit 532 can include a power management circuit. In various embodiments, battery 534 can include a rechargeable battery, and power circuit 532 can include a recharging circuit for recharging the rechargeable battery. In various embodiments, antenna 510 includes an inverted F antenna of the present subject matter. The antenna protrudes from the housing or faceplate in various embodiments (as shown in FIG. 3).

Figure 3:
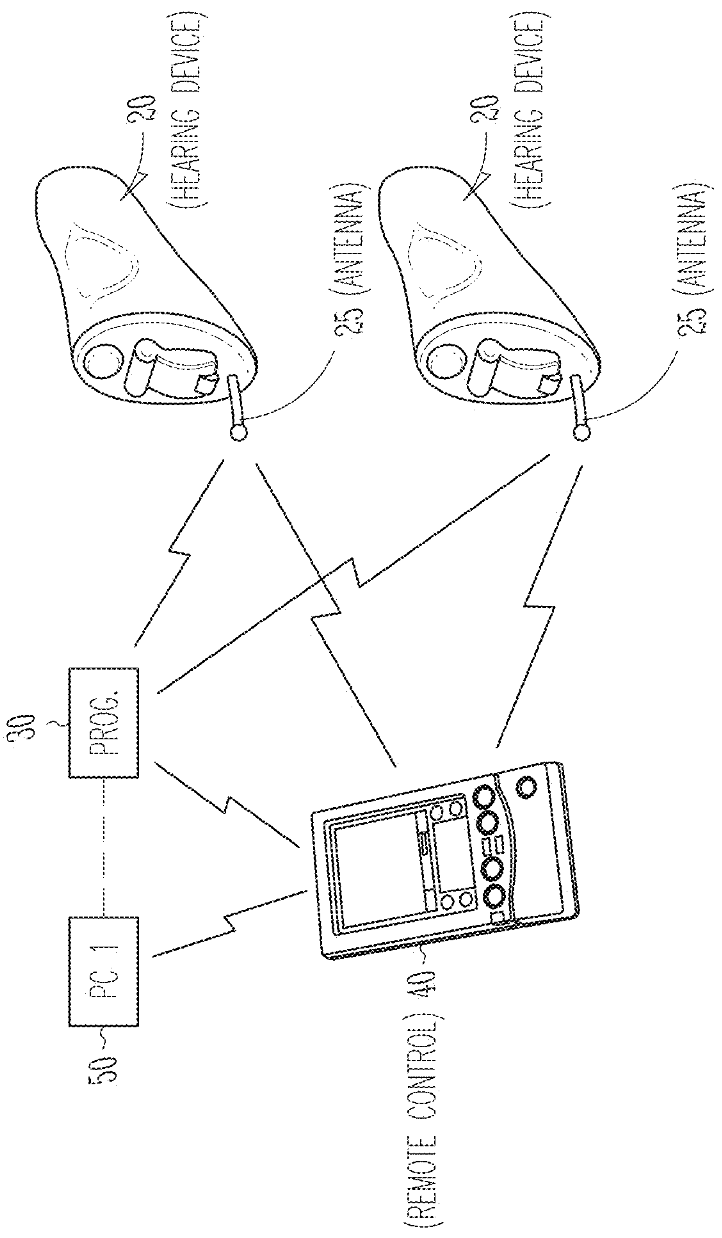
FIG. 3 illustrates a block diagram of a wireless system for fitting hearing assistance devices for a wearer, according to various embodiments of the present subject matter.

FIG. 3 illustrates a block diagram of a wireless system for fitting hearing assistance devices 20 for a wearer, according to various embodiments of the present subject matter. This system depicts an example of one of many systems in which a wireless hearing device communicates wirelessly. A wireless hearing assistance device programmer 30 configured to wirelessly communicate with a hearing assistance device 20 using at least one of a plurality of channels. The system may also include a host computer, such as PC 50, in communication with the wireless programmer. The PC 50 may be wired or wirelessly connected to the programmer 30, either directly or indirectly, in various embodiments. The wireless programmer 30 is configured to assist a user, such as an audiologist or other professional, in fitting the hearing assistance devices 20 for a wearer of the devices. A remote control device 40 can also be used, and is configured to communicate wired or wirelessly with the devices 20, the programmer 30, and/or the PC 50. The remote control device may include a mobile device, such as a smart phone, tablet or laptop, with an application running on the mobile device. In various embodiments, one or both of the hearing assistance devices 20 include an inverted F antenna 25 of the present subject matter, for use in radio frequency communications to assist in programming the hearing assistance device. Other types of wireless communication, such as streaming audio or other control functions, can be accomplished using the inverted F antenna 25, without departing from the scope of the present subject matter.

Figure 4:
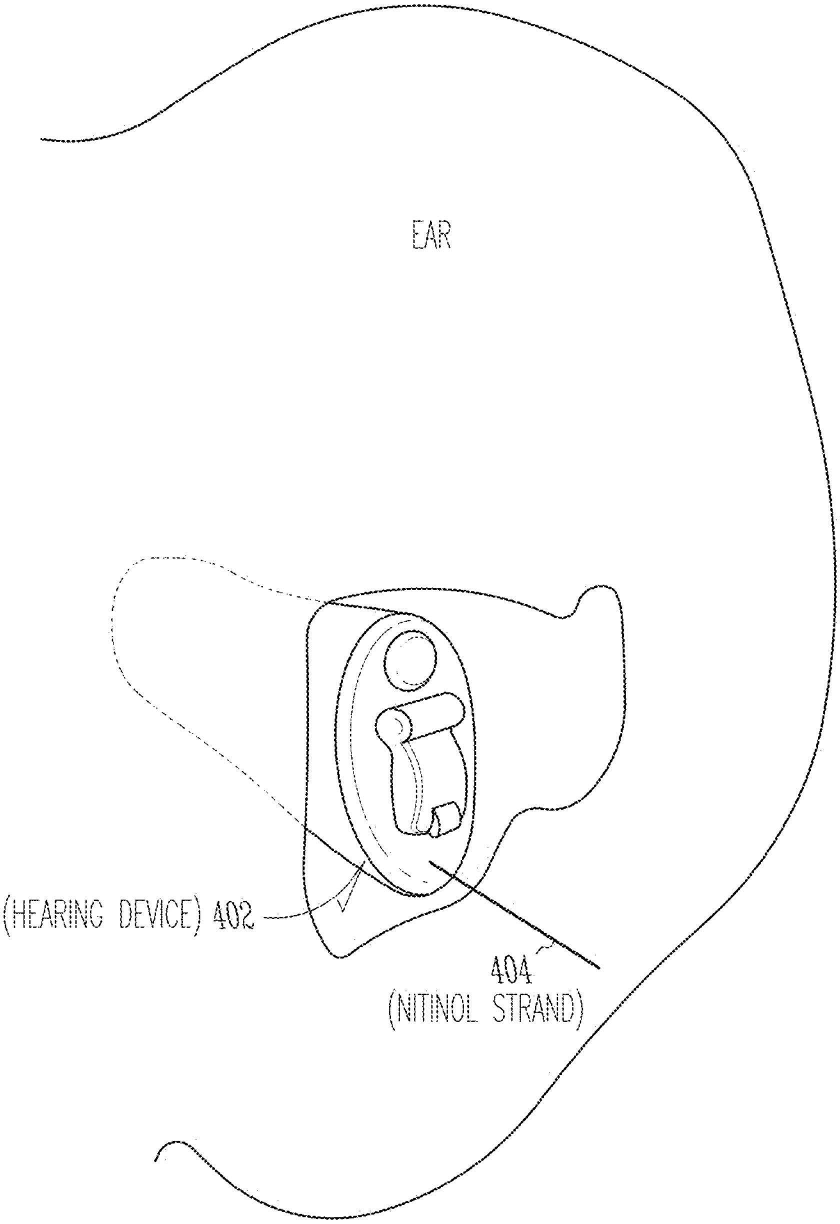
FIG. 4 illustrates a hearing device including an antenna having a Nitinol portion, according to various embodiments of the present subject matter.
Figure 5A:
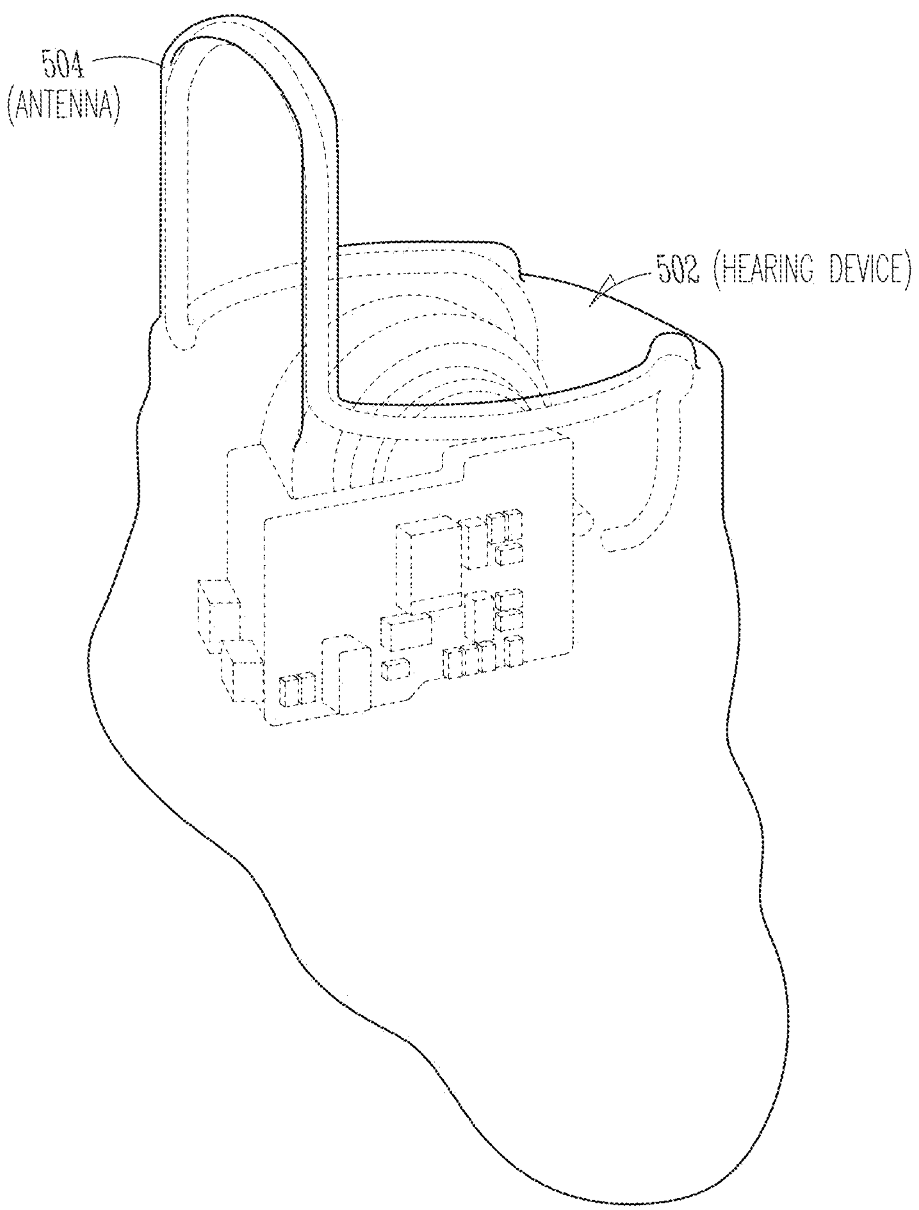
FIGS. 5A-5D illustrate hearing device including a partially external loop antenna in various orientations, according to various embodiments of the present subject matter.
Figure 5B:
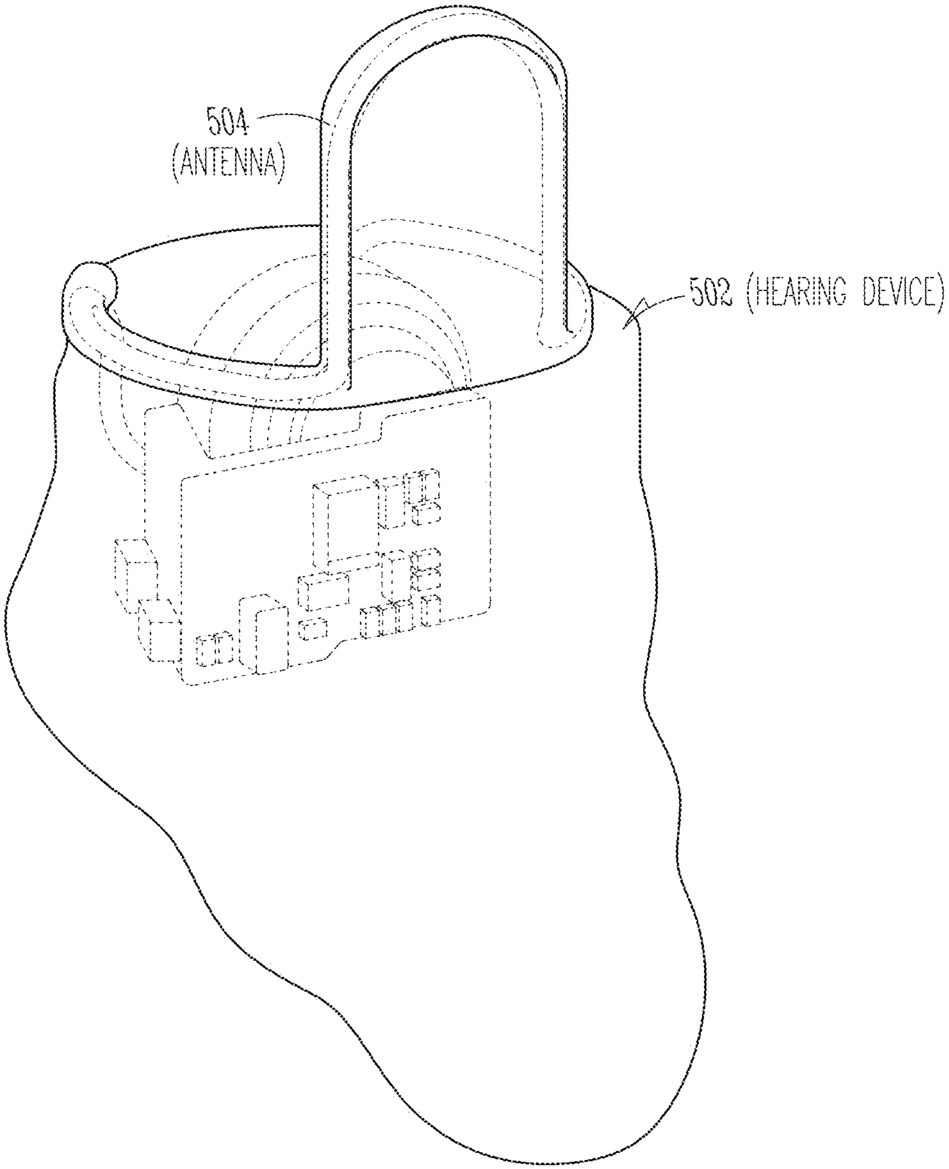
Figure 5C:
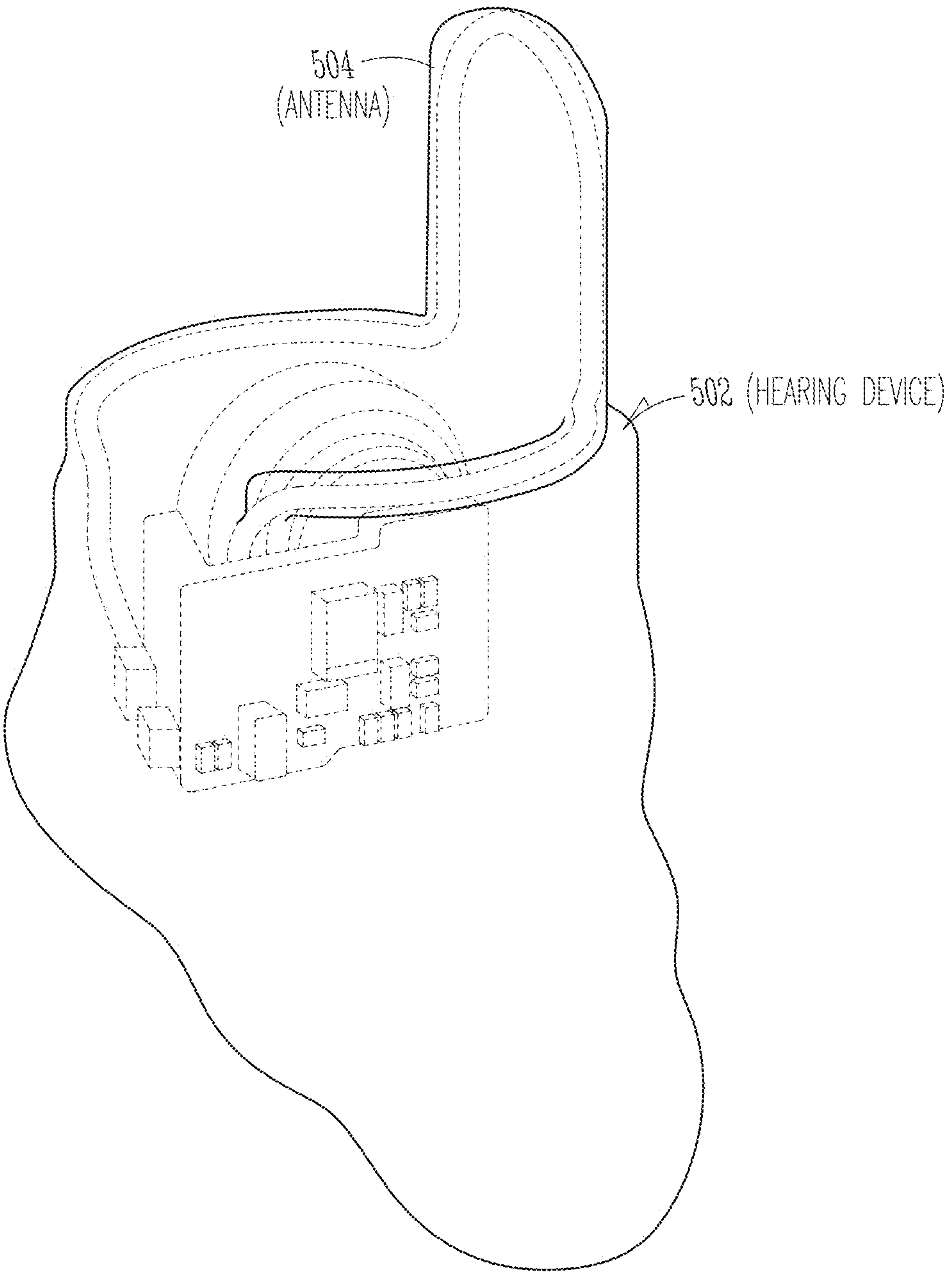
Figure 5D:
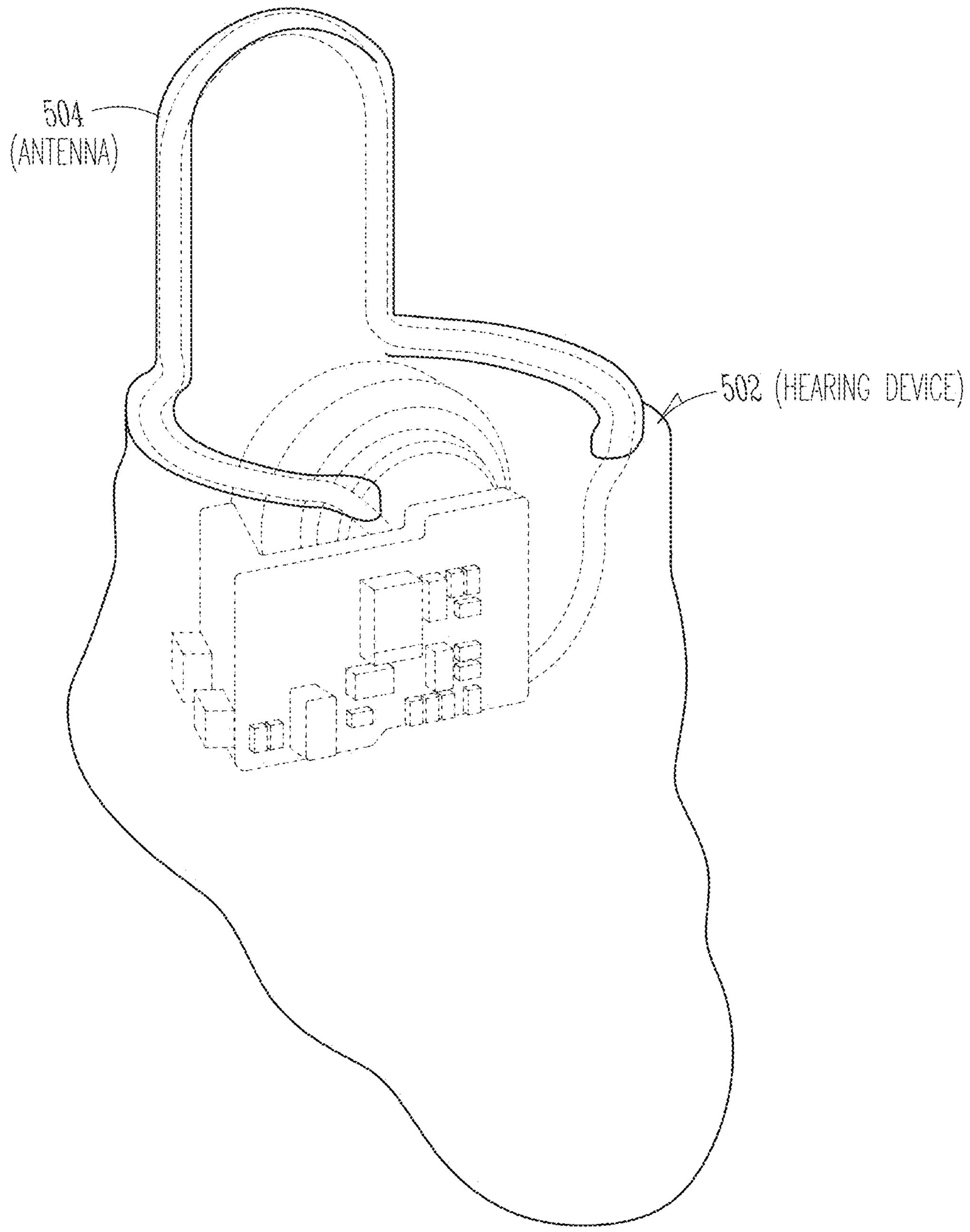

In various embodiments, the inverted F antenna includes a portion protruding from the faceplate or housing of the hearing device. In one aspect of the present subject matter, the portion protruding from the faceplate or housing is replaced with a Nitinol strand. Nitinol has unique mechanical properties, including superior strength, shape memory and super-elasticity, which can be used to provide a longer (more protrusion from the housing/faceplate) yet still aesthetically pleasing (thin and hair-like) antenna. FIG. 4 illustrates an embodiment of a hearing device 402 including an antenna of the present subject matter having a Nitinol portion 404 protruding from the device. In various embodiments, the Nitinol portion, or Nitinol strand, is formed by micro-welding the strand to the antenna to replace a copper portion extending from the housing or faceplate, to create a hybrid Nitinol-copper antenna. Nitinol is an extremely rigid material even at very small gauges. In one embodiment, the Nitinol portion of the antenna diameter is 0.005 inches and mimics a human hair. As a result, antenna length can be increased without sacrificing the aesthetic of the hearing device. In one embodiment, the Nitinol includes a 0.005 inch diameter wire. Increasing the length of the Nitinol strand to have approximately 30 mm protruding from the housing or faceplate (the optimum point from radiation performance wise) can improve the radiation efficiency by 35 times (15.4 dB). The hair-like profile of a Nitinol wire makes this length elongation much more realistic and acceptable than a common copper strip. In various embodiments, the Nitinol portion can be routed in different ways (internally or externally to the device housing) to allow increase in electrical length and realistic matching impedance. Where inside the faceplate, the antenna of the present subject matter uses space where the hearing circuit is not located. The Nitinol portion can be extended out of the faceplate and be placed next to a pull string or could be embedded in the faceplate with a little less efficiency, in various embodiments. The Nitinol strand avoids mechanical interference in the shell during assembly and an increases antenna efficiency to improve communication links. In various embodiments, the Nitinol strand can be used with any hearing device antenna, and is not limited to use with inverted F antennas.

A further aspect of the present subject matter includes a hearing device configured to be worn in an ear of a wearer to perform wireless communication. The hearing device includes a housing, hearing electronics within the housing, and a loop antenna disposed at least partially in the housing and configured for performing 2.4 GHz wireless communication. In various embodiments, a looped portion of the antenna protrudes from a surface of the housing. FIGS. 5A-5D illustrate hearing device 502 including a partially external loop antenna 504 in various orientations, including protruding from the left, right, front and back portions of the hearing device, according to various embodiments of the present subject matter. The perpendicular loop antenna 504 provides improved antenna efficiency for radio frequency communication. In various simulations, the efficiency of this antenna 504 was shown to be approximately −22 dB, which is 10 dB better than previous solutions. In various embodiments, the antenna includes a loop oriented perpendicularly (or substantially perpendicularly) to an external surface of the housing or a faceplate of housing, and partially extends beyond the external surface of the hearing device. In one embodiment, the antenna can be overmolded into the housing or faceplate. In various embodiments, the antenna can be part of the lead frame which makes up the battery contacts. In further embodiments, the antenna can extend out of the hearing device and may be part of a removal handle or string. The loop antenna creates an E-field perpendicular to the wearer's head, which improves an car-to-car communication link in various embodiments.

In various embodiments, the loop antenna 504 can be entirely embedded in the housing or faceplate, instead of partially protruding therefrom. The loop antenna 504 can be made of wire, stamped metal or other conductive materials, in various embodiments. In one embodiment, the loop antenna 504 can be provided within a canal lock. The loop antenna 504 of the present subject matter can be used in any in-car device that uses an RF communication link. In various embodiments, the loop antenna is integrated into the lead frame of a custom faceplate. The loop antenna is overmolded within the plastic of a custom faceplate, in various embodiments. The antenna loop extends perpendicular to the faceplate or housing to optimize car to car communication, in an embodiment. The antenna is made of formed wire or stamped metal, in various embodiments. In various embodiments, the antenna loop can be used as part of a removal handle or string. The external area of antenna could be partially or completely overmolded in plastic to hide it, in various embodiments. In one embodiment, the external area of antenna can serve as part of a canal lock. Further embodiments use dielectrically loaded elements (for example, a chip antenna) in series with the loop antenna to electrically lengthen the antenna or physically shorten the antenna. In various embodiments, the loop antenna can be a dipole or folded monopole antenna. In further embodiments, the housing can be printed such that the loop antenna would be within the shell and not protruding from the shell. The loop antenna includes a nitinol wire (or gold plated nitinol wire) to reduce visibility of the antenna, in various embodiments. The loop antenna projects on the same plane internally to the housing and externally to the housing, in an embodiment. By providing the looped antenna portion externally to the housing and the car of the wearer, body loading is decreased and effective antenna length is increased. In addition, by providing a looped antenna portion perpendicular (or substantially perpendicular) to the wearer's head, the resulting electric field is normal to the wearer's head and provides an improved communication network and car-to-car communication performance.

Various embodiments of the present subject matter support wireless communications with a hearing assistance device. In various embodiments the wireless communications can include standard or nonstandard communications. Some examples of standard wireless communications include link protocols including, but not limited to, Bluetooth™, IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. Although the present system is demonstrated as a radio system, it is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

It is understood that variations in combinations of components may be employed without departing from the scope of the present subject matter. Hearing assistance devices typically include an enclosure or housing, a microphone, hearing assistance device electronics including processing electronics, and a speaker or receiver. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

It is further understood that any hearing device may be used without departing from the scope and the devices depicted in the figures are intended to demonstrate the subject matter, but not in a limited, exhaustive, or exclusive sense. It is also understood that the present subject matter can be used with a device designed for use in the right car or the left ear or both ears of the user.

It is understood that the hearing aids referenced in this patent application include a processor. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, audio decoding, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

The present subject matter is demonstrated for hearing devices, such as ear buds and hearing assistance devices, including hearing aids, including but not limited to, behind-the-car (BTE), in-the-ear (ITE), in-the-canal (ITC), receiver-in-canal (RIC), invisible-in-canal (IIC) or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-car (RITE) designs. The present subject matter can also be used in hearing devices generally, such as cochlear implant type hearing devices and such as deep insertion devices having a transducer, such as a receiver or microphone, whether custom fitted, standard, open fitted or occlusive fitted. It is understood that other hearing devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing device configured to be worn in an ear of a wearer to perform wireless communication, comprising:
- a housing including a removal string;
- hearing electronics within the housing;
- an inverted F antenna disposed at least partially in the housing and configured for performing 2.4 GHz wireless communication, the antenna having a single ended structure; and
- a faceplate connected to the housing, wherein a portion of the antenna protrudes from the faceplate and is attached to the removal string.

2. The hearing device of claim 1, wherein at least a portion of the antenna is embedded in the faceplate.

3. The hearing device of claim 1, wherein the faceplate includes a battery contact, and wherein the antenna is integrated in the battery contact.

4. The hearing device of claim 1, wherein the portion of the antenna that protrudes from the faceplate includes Nitinol.

5. The hearing device of claim 1, further comprising a battery drawer configured to contain a battery, and wherein the antenna includes a portion embedded in the battery drawer.

6. The hearing device of claim 1, wherein the antenna includes a wire portion.

7. The hearing device of claim 1, wherein the antenna includes stamped metal portion.

8. The hearing device of claim 1, wherein housing includes a housing for a hearing assistance device.

9. The hearing device of claim 8, wherein the hearing assistance device includes an in-the-ear (ITE) hearing aid.

10. The hearing device of claim 8, wherein the hearing assistance device includes an in-the-canal (ITC) hearing aid.

11. The hearing device of claim 8, wherein the hearing assistance device includes a completely-in-the-canal (CIC) hearing aid.

12. The hearing device of claim 8, wherein the hearing assistance device includes an invisible-in-canal (IIC) hearing aid.

13. A method of forming a hearing device configured to be worn in an ear of a wearer to perform wireless communication, the method comprising:

connecting an inverted F antenna to hearing electronics within a housing of the hearing device, the antenna disposed at least partially in the housing, configured for performing 2.4 GHz wireless communication, and having a single ended structure; and connecting a faceplate to the housing, wherein a portion of the antenna protrudes from the faceplate and is attached to a removal string.

14. The method of claim 13, wherein at least a portion of the antenna is molded within a faceplate of the housing.

15. The method of claim 13, wherein the faceplate includes a sport lock, and a portion of the antenna is included in a portion of the sport lock.

16. The method of claim 13, wherein the housing includes a sport lock, and a portion of the antenna is included in a portion of the sport lock.

17. The method of claim 13, wherein the portion of the antenna protrudes approximately perpendicularly from the faceplate.

18. The method of claim 13, wherein the antenna is configured for use in radio frequency communications to assist in programming the hearing device.

19. The method of claim 13, wherein the antenna is configured for use in streaming audio to the hearing device.

20. The method of claim 13, wherein the portion of the antenna that protrudes from the faceplate includes Nitinol.

* * * * *